Dec. 4, 1962

H. REHN 3,066,884

FILM TAKE-UP ASSEMBLY FOR CAMERA

Filed May 6, 1960

3,066,884
Patented Dec. 4, 1962

3,066,884
FILM TAKE-UP ASSEMBLY FOR CAMERA
Heinz Rehn, Braunschweig, Germany, assignor to Voigtländer A.G., Braunschweig, Germany, a corporation of Germany
Filed May 6, 1960, Ser. No. 27,414
Claims priority, application Germany Sept. 15, 1959
4 Claims. (Cl. 242—71)

This invention relates to improvements in the film advance mechanism of a photographic (still) camera, and in particular relates to improved slip clutch means for the film take-up spool of such a mechanism.

It is known to provide a film advance mechanism having a film transport pinion and a film take-up spool driven simultaneously by a common control. The film transport pinion engages the film without slippage, for example by engagement of teeth of the pinion in perforations of the film, and is always advanced a uniform angular distance in order to advance the film from one frame to the next. The film which is thus advanced is received upon the takeup spool, which is mounted on a shaft which turns in unison with the film transport pinion. Since the diameter of the film roll on the take-up spool increases as more and more film is advanced, it is necessary to provide slip clutch means between the take-up spool and its shaft, so as to permit variability in the angular movement of the take-up spool relative to the angular movement of the pinion.

An important object of this invention is to provide an improved slip clutch between the film take-up spool and its shaft, which is economical to manufacture, easy to maintain and of simple construction.

Another important object of this invention is to provide an improved slip clutch which is unitary with the film take-up spool.

In accordance with preferred embodiments of the invention, the take-up spool is mounted on a shaft preferably having a collar thereon. A first end portion of the take-up spool is rigid and has a bore through which the shaft extends freely turnably. The collar is spaced from this first end portion of the spool. The second end portion of the spool includes a sleeve which extends frictionally slidably around the collar and is radially resilient. Thus, the sleeve may have one or more axial slits to impart the desired resilience thereto. The resilience of the sleeve, or else the tightness with which it is clamped upon the collar, is regulated so as to secure the desired slippage of the spool upon its shaft.

While the spool and its integral slip clutch can be made of metal or other suitable material, they are advantageously made of plastic and may be molded or otherwise formed with a minimum of operations.

Other objects and advantages of this invention will become apparent from the following description, in conjuction with the annexed drawing, in which preferred embodiments of the invention are disclosed.

Figure 1:
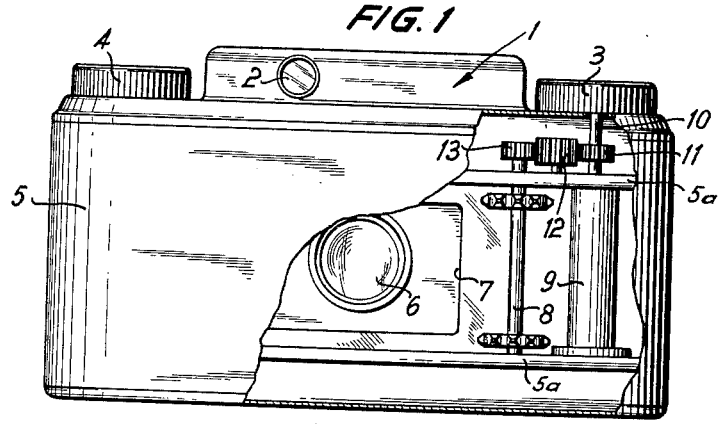
FIG. 1 is a rear view of a photographic (still) camera with its rear wall partially broken away.

The photographic (still) camera has a camera cap 1 with a finder eyepiece 2 and knobs 3 and 4 respectively for the film transport and film rewinding. The rear wall 5 of the camera is partially broken away so that the rear member 6 of a taking lens and a picture window 7 can be seen, alongside of which there are arranged a film transport pinion 8, which engages in the perforation of a film (not shown) and a film take-up spool 9. The film advances longitudinally, and pinion 8 and spool 9 extend laterally. Pinion 8 is mounted on the camera body so as to be turnable about its axis. The film take-up spool 9 is supported on a lateral shaft 10 connected to the film advance knob 3, said shaft being connected by gears 11, 12 and 13 with the film transport pinion 8 so that upon the turning of the knob 3, both the shaft 10 and the film transport pinion 8 are turned in unison. Pinion 8 and shaft 10 are journaled in longitudinal frame members 5a of the camera. Spool 9 is located between frame members 5a, which prevent lateral shifting of spool 9.

In order that the film is advanced by pinion 8 onto spool 9 without the formation of loops as well as without excessive pull onto the film take-up spool 9, said spool 9 is connected by slip-clutch means to shaft 10 so that the angular movement of the spool relative to angular movement of pinion 8 can change to compensate for increase in size of the film roll.

Figure 2:
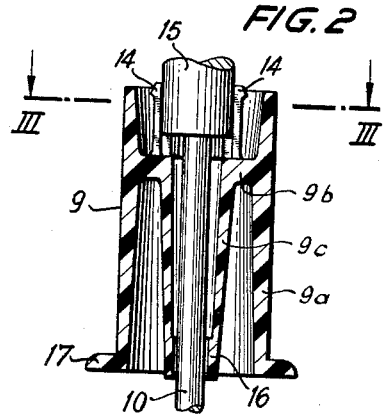
FIG. 2 is a section, drawn to enlarged scale, of the film take-up spool on its shaft.
Figure 3:
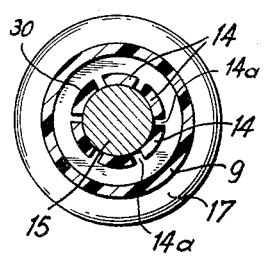
FIG. 3 is a section on line III—III of FIG. 2.

In the embodiment of FIGS. 1–3, spool 9 is optionally and preferably molded from suitable plastic so as to be generally rigid. Spool 9 has an outer cylindrical wall 9a whose axis extends laterally. One end of wall 9a is provided with an external annular peripheral flange 17 for retention of the film upon the outer surface of wall 9a. Wall 9a is provided with an internal, transverse, annular, circumferential flange 9b intermediate the ends thereof. Preferably, flange 9b is located more remote from flange 17 than from the other end of wall 9a. There is a relatively large clearance of shaft 10 within the opening of flange 9b.

A laterally extending flange 9c connects with flange 9b and extends around the periphery of the central opening thereof. Flange 9c also extends from flange 9b to the end of spool 9 at which flange 17 is located and is slightly tapered in the direction from flange 9b toward flange 17 so as to be frusto-conical in shape. The free end portion 16 of flange 17 is shaped with an internal boss to have a cylindrical bore. Said free end portion 16 of flange 17 will hereinafter be referred to as a sleeve. Sleeve 16 is rigid and is freely turnable upon shaft 10. Sleeve 16 is radially inwardly spaced from wall 9a.

Optionally and preferably, collar 15 is fixedly mounted upon shaft 10 at the end portion of spool 9 which is remote from flange 13 and is laterally spaced from flange 9b.

Laterally extending, generally cylindrical sleeve 30 connects with flange 9b radially outwardly of the center opening thereof and extends around collar 15 and to the end of spool 9. A plurality of slits 14a are formed in sleeve 30. These slits 14a extend laterally the entire length of sleeve 30 and are equally spaced circumferentially, and thereby divide sleeve 30 into a plurality of tongues 14. By reason of the slits 14a, these tongues, and their connections wtih flange 9b, are somewhat flexible and resilient. Tongues 14 engage the periphery of collar 15 frictionally.

Shaft 10 drives spool 9 by reason of the frictional engagement of resilient sleeve 30 on collar 15. However, sleeve 30 serves as a slip clutch, permitting spool 9 to slip relative to shaft 10 as the diameter of the film roll on spool 9 increases. The effectiveness of the clutch can be controlled in obvious ways, by the degree of resilience of fingers 14, the tightness of their fit on collar 15, etc.

The use of collar 15 is preferred, since it increases the effective clutch area.

Figure 4:
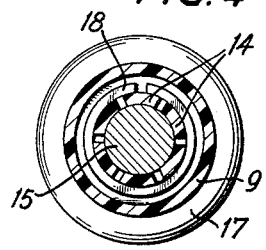
FIG. 4 is a view similar to FIG. 3, showing a second embodiment of the spool.

The film take-up spool shown in FIG. 4 is similar in its construtcion and support on the shaft 10 to the spool shown in FIGS. 1 to 3. In order to maintain the friction between the tongues 14 and the collar 15 at a predeterminable value, a resilient open retaining ring 18 is placed from the outside around the tongues 14, this ring, in accordance with its own force, holding the tongues 14 with greater or lesser force against the collar 15. A circumferential groove (not shown) can be provided in the tongues 14 for the positioning of retaining ring 18.

Figure 5:
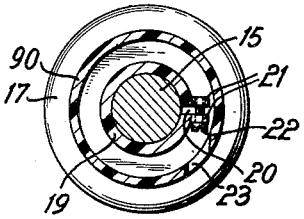
FIG. 5 is a view similar to FIG. 3, showing a third embodiment of the spool.

In the case of the film take-up spool 90 shown in FIG. 5, the resilient sleeve which rests against the collar 15 does not consist of tongues but of a circumferential wall 19 having a slot 20 extending laterally the entire length thereof. On the wall parts which are separated from each other by slot 20, there are formed integral lugs 21 which extend radially outwardly therefrom. One lug 21 has a threaded hole and the other a passage hole for an adjustment screw 22. By adjusting the adjustment screw 22, the lugs 21 can be moved with respect to each other. The wall 19 which is thereby held under tension, thereupon bears wtih greater or lesser force against the collar 15, depending upon the setting of screw 22, with the result that the friction between sleeve 19 and the collar 15 can be adjusted. The adjustment screw 22 is accessible through a cutout 23 in the outer wall of the spool.

While a preferred embodiment of the invention has been disclosed, and various possible changes, omissions and additions have been indicated, it will be apparent that various other changes, omissions and additions may be made in the invention without departing from the scope and spirit thereof.

What is claimed is:

1. A film take-up spool for mounting on a rotatable mounting shaft, comprising an integral unit including a relatively elongated, substantially cylindrical, and relatively rigid outer sleeve for winding of a film thereon, a relatively elongated circular cross section inner hub shorter than said sleeve and in coaxial radial spaced relation therewith, an outer end of said hub being substantially coterminous with one end of said outer sleeve, radially extending web means integral with said outer sleeve and said hub and connecting the inner end of said hub to said outer sleeve intermediate the ends of the latter, and a tubular collar integral with said web means and coaxial with said hub, and in radially spaced relation to said outer sleeve, said collar extending from said web means toward the other end of said outer sleeve; said outer sleeve being free of connection to said hub and said collar except at said web means; said hub being arranged to have a winding shaft telescoped therethrough; said collar being formed with circumferentially spaced substantially parallel slots extending longitudinally inwardly from its outer end substantially to said web means to provide plural resilient fingers for frictionally gripping a winding shaft to constitute a slip-clutch connection of said spool to the winding shaft.

2. A film take-up spool as claimed in claim 1 including resilient means peripherally embracing said fingers and biasing the latter inwardly for frictional engagement with a winding shaft.

3. A film take-up spool as claimed in claim 1 in which said integral unit is molded from a plastic composition material.

4. A film take-up spool as claimed in claim 1 including an annular member of resilient material embracing said fingers and biasing the same radially inwardly.

References Cited in the file of this patent

UNITED STATES PATENTS

| 1,156,579 | Benjamin | Oct. 12, 1915 |
| 1,972,784 | Magrath | Sept. 4, 1934 |
| 2,057,198 | Marcussen | Oct. 13, 1936 |
| 2,657,876 | Bieber | Nov. 3, 1953 |
| 2,985,403 | Mason | May 23, 1961 |